G. L. Hart,
Saw Trap.
No. 110,973. Patented Jan. 17, 1871.

Witnesses
Theo. G. Ellis
W. E. Simonds

Inventor.
George L. Hart

United States Patent Office.

GEORGE L. HART, OF NEW BRITAIN, CONNECTICUT.

Letters Patent No. 110,973, dated January 17, 1871.

IMPROVEMENT IN ANIMAL-TRAPS.

The Schedule referred to in these Letters Patent and making part of the same.

I, GEORGE L. HART, of New Britain, in the county of Hartford and State of Connecticut, have made certain Improvements in Animal-Traps, of which the following is a specification.

Nature and Objects of the Invention.

This trap is intended for the purpose of catching large or small animals, from rats and mice upward, the size of the trap being varied to adapt it to the game desired to be ensnared.

Description of the Accompanying Drawing.

Figure 1:
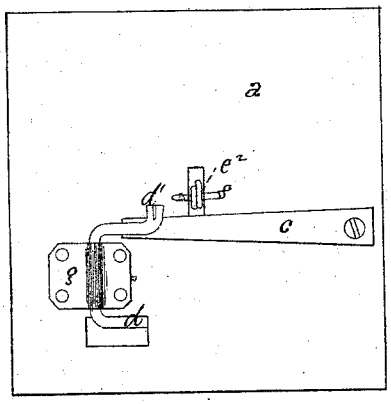
Figure 2:
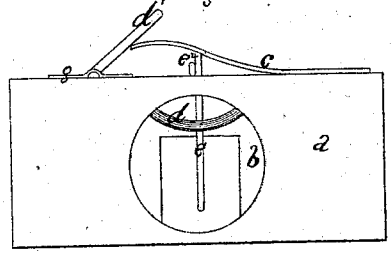
Figure 3:
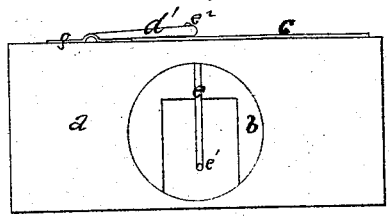

Figure 1 is a plan view of the trap, unset.
Figure 2 is a front view of the trap, unset.
Figure 3 is a front view of the trap, set.

General Description.

The letter $a$ designates a block of wood, of the same size as shown in the drawing, a large space on the under side of which is cut away, and the circular opening $b$ let into this open space.

The trap shown is of the size convenient for catching mice.

On the top of the block $a$ is fastened, by one end, the flat spring $c$, bearing up smartly against the arm $d'$, which is a part of the "choker" $d$; and the action of the spring is such as to throw the choker $d$, when released from the catch of the bait-hook, up against the top of the open space in the under side of the block $a$, as seen in fig. 2, and thus tightly hold the unfortunate mouse who has unconsciously provoked its embrace.

The bait-hook $e$ is much like the common bait-hook used in the common wood choker mouse-trap; to the lower end $e^1$ the bait is fastened; near its upper end it swings on the cross-pin $f$.

The top of the bait-hook $e^2$ is bent forward, so as to catch upon and hold down the end of the arm $d'$, which is flattened for that purpose, when it is desired to set the trap.

The arm $d$ has a bearing on the top of the block $a$, into which it is held by the cap $g$.

The trap is sprung by the mouse pulling upon the bait, and thus releasing the arm $d'$ from the catch $e^2$.

Claim.

I claim as my invention—

The combination of the block $a$, spring $c$, choker $d$, and bait-hook $e$, the whole constructed and arranged substantially as and for the purpose set forth.

GEORGE L. HART.

Witnesses:
  THEO. G. ELLIS,
  W. E. SIMONDS.